July 23, 1963    V. E. SUOMI ETAL    3,098,380
RADIATION MEASURING DEVICE
Filed Sept. 6, 1960    2 Sheets-Sheet 1
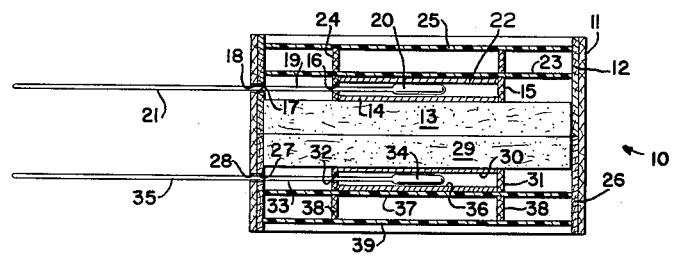
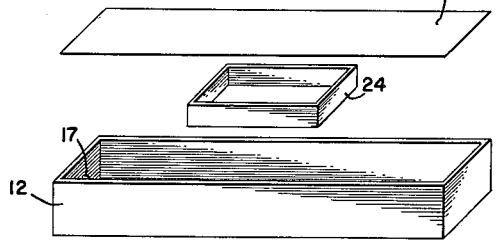
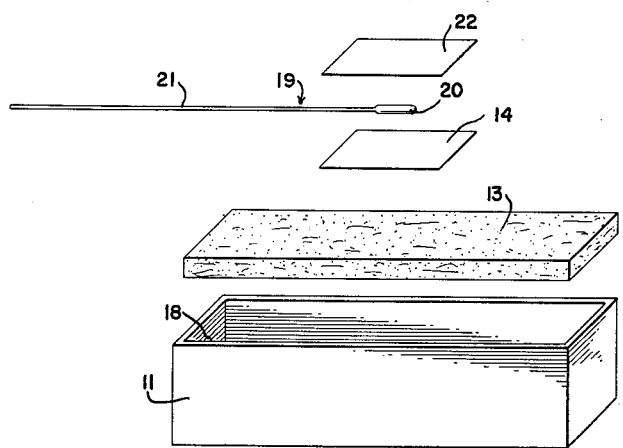
INVENTORS
V. E. SUOMI
P. M. KUHN
BY Adams, Forward & McLean
ATTORNEYS July 23, 1963 V. E. SUOMI ETAL 3,098,380
RADIATION MEASURING DEVICE
Filed Sept. 6, 1960 2 Sheets-Sheet 2
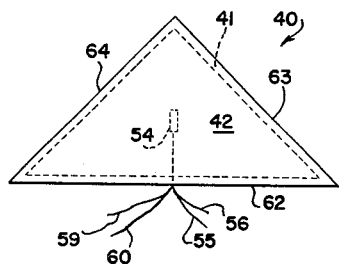
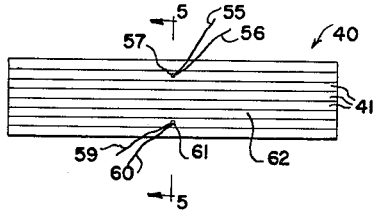
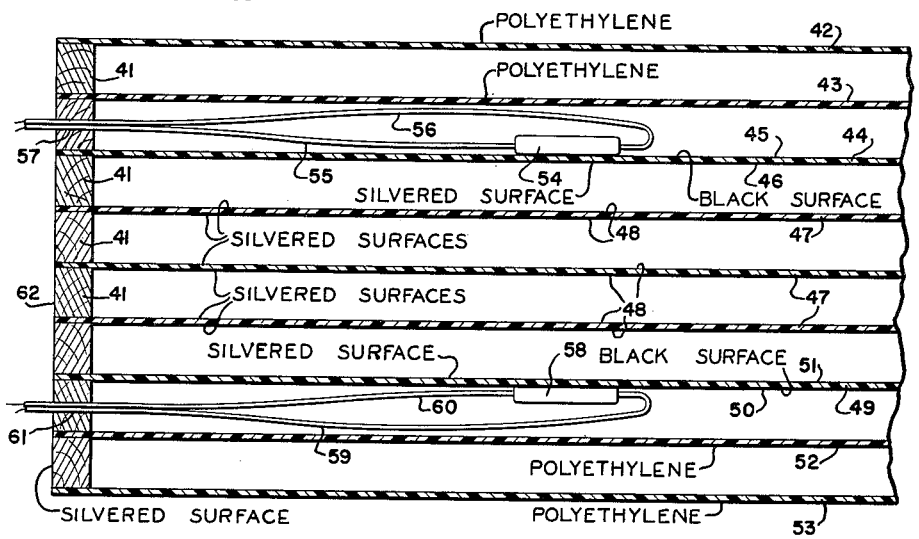
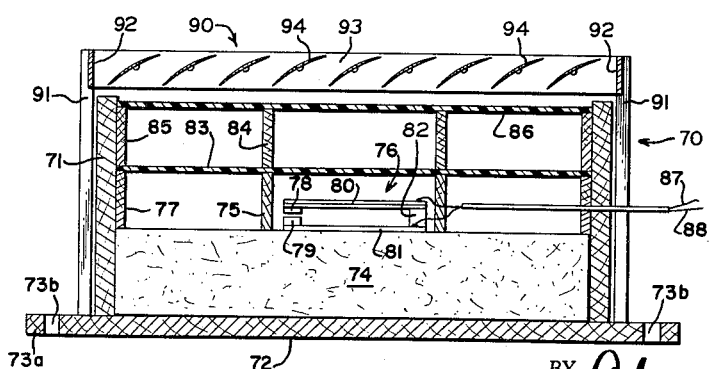
INVENTORS
V. E. Suomi
P. M. Kuhn
BY Adams, Forward-McLean
ATTORNEYS

United States Patent Office 3,098,380
Registered July 23, 1963

3,098,380
RADIATION MEASURING DEVICE
Verner E. Suomi, Madison, and Peter M. Kuhn, McFarland, Wis., assignors to Wisconsin Alumni Research Foundation, Madison, Wis., a corporation of Wisconsin
Filed Sept. 6, 1960, Ser. No. 54,097
5 Claims. (Cl. 73—170)

This invention relates to measurement of thermal radiation in the infrared frequency range and in particular provides a radiometer of simple construction adapted to a variety of uses.

A knowledge of infrared radiation particularly in the range of about 0.2–50 micron wave length is extremely useful for a number of purposes. Thus, net radiation, i.e. radiation normal to the earth's surface obtained as a difference of total upward radiation flux and total downward radiation flux is important in many meterological problems because it is a measure of the energy available at the earth-atmosphere interface. This energy exchange at the earth's surface represents the major input to the giant heat engine which circulates the atmosphere. It is also possible to compute minimum surface temperatures, given the net radiation at sunset and the soil thermal properties. Thus, by a knowledge of net radiation, frost forecasting can be greatly expedited. Evaporation from a growing field crop is also highly correlated with net radiation, and a knowledge of net radiation data thus is also useful in irrigation control. The control of heating homes and other buildings can also be improved by a knowledge of the radiation rate employed in conjunction with a knowledge of the temperature of the building.

The devices which have heretofore been available, for measuring total or net radiation are rather complicated and quite expensive, thus limiting the practical development of complete knowledge of radiation in any given problem. In the case of meterological data only a few stations over the entire earth have been set up to make net radiation observations because of the expense of the presently available radiometers. The control of heating homes and other buildings, although it can be advantageously tied in with the radiation rate within the building, has not heretofore included such an expedient probably because of the cost and complexity of the necessary equipment involved.

It is therefore a primary object of this invention to provide a radiometer useful for making net and total radiation measurements which is relatively simple in construction and yet obtains a moderate accuracy thus permitting its useful application to radiation observations for meteorological, heat control and other purposes on a far more widespread basis than has heretofore been thought possible.

It is also an important object of this invention to provide an inexpensive radiometer which can be produced in great numbers while obtaining consistent radiation measurements on a widespread basis and avoiding the necessity of calibrating each radiometer against the others.

It is a further object of this invention to provide a relatively simple radiometer light enough to be carried aloft by a small balloon.

These and other important objects and advantages of this invention are based in part on the fact that thin crystalline polyethylene film such as is commercially available for package wrapping, in addition to possessing good thermal conduction insulating qualities unexpectedly is an excellent transmitter for thermal radiant energy and in part on the discovery that when thermal radiant energy is admitted into a confined space through a pane of such a polyethylene film, heat transfer by convection can be eliminated and heat transfer by conduction can be minimized providing one dimension of the confined space is substantially limited, e.g. on the order of 0.7 centimeter, and a thermal detector is positioned in the space with the thermal detector and polyethylene pane at opposite ends of such limited dimension.

The elimination of heat transfer by convection is essential in an inexpensive radiometer of the type to which the present invention relates. Having the confined space constructed so as to minimize conduction and evacuated to eliminate convection would accomplish this but obtaining and maintaining the vacuum has proven impractical if not impossible. In the search for a practical solution to the problem it was found, on the one hand, that when the spacing is substantially less than 0.7 cm. convection is eliminated but conduction is too high and, on the other hand, that when the spacing is substantially greater than 0.7 cm. conduction is low but convection is too high. With a spacing on the order of 0.7 cm., however, it was found that convection is eliminated and that conduction is minimized to a point at which it can be readily provided for in the treatment of the data obtained. With the proper spacing maintained in the confined space between the polyethylene film forming the radiation aperture and the thermal detector, the necessity of calibrating each radiometer against the others is also avoided.

It will be understood that the expression "thermal detector" will include normally a thermally sensitive element such as a thermistor, a thermometer, a thermocouple, a bimetallic device such as a thermostat, or the like, which is capable of either indicating large differences in temperature or controlling an external device as a function of temperature. The thermal detector will, of course, ordinarily also include a body which absorbs thermal radiation, the temperature of which is measured by the thermally sensitive device, although in some instances these may be identical. It should be further understood that where it is desired to make the radiometer directional, the polyethylene pane, i.e. radiation aperture, will be located on the unit such that it faces only the direction in which measurements are to be made while the rest of the insulated enclosure of the thermal detector can include materials which also reflect thermal radiation, as well as insulating against conduction and shielding against convection transfer. Any lightweight insulating material, however, can be used.

The radiation aperture can be constructed of one pane of polyethylene properly spaced as noted above. Desirably also the radiation aperture can be constructed of a pair of properly spaced (e.g. again about 0.7 cm.) panes of polyethylene.

If a net radiometer is desired, such a construction is simply accomplished by constructing a pair of directional radiometers and placing these back-to-back such that the net radiometer can be placed upon or near the ground with one end measuring the total radiation from the ground and the other measuring total radiation downward.

The radiometers provided by this invention have been found, by reason of the spacing of the thermal detector and polyethylene radiation aperture, to be particularly useful in obtaining meteorological data relating to net radiation at various altitudes in connection with the employment of radiosonde balloons, as the varying effects produced by changing elevation such as reduction in atmospheric pressure, changes an atmospheric temperature and the like, do not affect the net radiation measurements permitting correlation between measurements made at low altitudes with those made at high altitudes and between measurements made at different geographic locations under differing atmospheric conditions.

For a more complete understanding of the practical application of the principles of this invention, reference is made to the appended drawings in which:

FIGURE 1 is a vertical, sectional view of a net radiometer constructed in accordance with the principles of this invention;

FIGURE 2 is an exploded, enlarged perspective view of a portion of the radiometer shown in FIGURE 1;

FIGURE 3 is a plan view of another net radiometer constructed in accordance with the invention;

FIGURE 4 is an elevational view of the radiometer shown in FIGURE 3;

FIGURE 5 is an enlarged, fragmentary vertical sectional view of the radiometer shown in FIGURES 3 and 4 as seen from section line 5—5 in FIGURE 4; and FIGURE 6 is a vertical, sectional view of another radiometer constructed in accordance with this invention which is peculiarly adapted to controlling the heating of buildings and the like.

Referring particularly to FIGURES 1 and 2 of the drawings, the reference numeral 10 designates a net radiometer enclosed within a rectangular, balsa wood, box frame 11 which includes a pair of back-to-back radiometers, the upper of which is seen also in exploded FIGURE 2 along with frame 11.

The upper radiometer section of radiometer 10 includes a balsa wood, inner box frame 12 which is of rectangular construction and sized to fit snugly within the upper half of frame 11. Both frames 11 and 12 suitably are constructed from four pieces of thin balsa wood which are mounted together to form a rectangular box with open bottom and top. In the lower end of frame 12 there is positioned a rectangular block of rigid fiber glass insulation 13 having 2½ lb. density. The edges of block 13 are cemented to the inner faces of upper, inner box frame 12 to provide good mechanical connection. Mounted centrally on block 13 is a small rectangular sheet of blackened aluminum foil 14. Foil 14 is held in position to prevent its lateral movement by cementing to block 13 and also by a guard frame 15 which is a rectangular box of substantially smaller dimensions than frame 12 cemented along its lower edges to block 13. Guard frame 15 is also open at both bottom and top and is preferably constructed of balsa wood. Guard frame 15 is provided with a small aperture 16 which registers with an aperture 17 in inner box frame 12 and with an aperture 18 in outer box frame 11. A thermometer 19 is laid horizontally with its bulb 20 resting on blackened aluminum foil 14 and with its stem 21 projecting externally of radiometer 10 through apertures 16, 17 and 18, thus permitting the temperature at the location of bulb 20 to be read externally of the box. A second layer of blackened aluminum foil 22 is placed within guard frame 15 over bulb 20, and a sheet 23 of 0.50 mil thick polyethylene film having an average molecular weight of 16,000 is stretched across the interior of frame 12 with its underside resting on and cemented to the upper edges of guard frame 15. Suitably the edges of sheet 23 are cemented to the inner faces of frame 12. A second guard frame 24 having identical construction to guard frame 15, except for the omission of aperture 16, is placed directly on polyethylene sheet 23 aligned with guard frame 15. The under edges of guard frame 24 can, if desired, be cemented to the upper face of polyethylene film 23. The upper section of radiometer 10 is completed by a second sheet 25 of the same 0.50 mil thick polyethylene film which is stretched over the upper edges of guard frame 24 between the inner faces of box frame 12 and which can be cemented at its edges to the inner faces of box frame 12 and cemented on its underside to the upper edges of guard frame 24. In keeping with the above-noted critical spacing requirement, the vertical dimensions of guard frame 24 and of guard frame 15 should be approximately 0.7 centimeter.

The lower radiometer section is substantially identical to the upper radiometer section except that the parts are assembled in reverse order and includes a lower, inner box frame 26 which is identical to box frame 12 and is provided in one face with an aperture 27. Box frame 26 is also constructed typically of four sheets of balsa wood and is open at both top and bottom. Box frame 26 is inserted into frame 11 from the lower end thereof up to a position abutting upper box frame 12. Aperture 27 in this position registers with an aperture 28 in outer box frame 11 which lies beneath aperture 18 in frame 11. A block of fiber glass insulation 29 is inserted into frame 26 up to a position abutting insulation 13 and is cemented along its edges to the inner surfaces of box frame 26. A sheet of blackened aluminum foil 30 of the same size of sheets 14 and 22 is cemented to the under surface of insulation 29 and enclosed along its edges by a small guard frame 31 which is constructed identically with guard frame 15 and which is provided with an aperture 32 positioned to register with apertures 27 and 28. A thermometer 33 is placed with its bulb 34 immediately under foil 30 with its stem 35 extending through apertures 32, 27 and 28 which receive stem 35 sufficiently tightly to retain bulb 34 in position against foil 30. Another sheet of blackened aluminum foil 36 is placed within the confines of guard frame 31 immediately under bulb 34 and is held in position by cementing a sheet 37 of the same polyethylene film in position stretched across the under edges of guard frame 31. Film 37 should be cemented to the edges of guard frame 31 and can also be cemented at its edges to the inner walls of box frame 26. Another guard frame 38 having identical dimensions with guard frame 31 and guard frame 24 is positioned against the underside of film 37 with its upper edges cemented to film 37 and with its sides aligned with the sides of guard frame 31. Another sheet 39 of the same 0.5 mil thick polyethylene film is stretched across the under edges of guard frame 38 to which it is cemented and desirably is also cemented at its edges to the inner wall of box frame 26.

It will be observed in the construction just described that a thermally sensitive device, thermometer 19, is placed within an absorbent air body defined by blackened metal foil sheets 14 and 22 to indicate the temperature of such sheets. Similarly, thermometer 33 is positioned to indicate the temperature of the body of confined air between blackened sheets 30 and 36. In the case of both the upper and lower sections each associated pane of blackened foil sheets is protected from radiation from the direction of the other pair by the presence of insulating blocks 13 and 29 which also prevent thermal transfer to the sheets by conduction. Similarly, box frames 11, 12 and 26 have trapped between them and their associated guard frames 15, 24, 31 and 38, a series of dead air spaces which prevent movement of air within radiometer 10 and consequently prevent transfer of thermal energy by conduction or convection to the blackened metal foils from all directions not protected by insulating blocks 13 and 29. Also box frames 11, 12 and 26 and guard frames 15, 24, 31 and 38 prevent transmission of thermal radiation to blackened metal foils 14, 22, 30 and 36 from directions substantially to the sides of radiometer 10. When radiometer 10 is oriented above and horizontal to the earth's surface it intercepts radiation flux upwardly from the earth which is transmitted without substantial attenuation through the panes formed by thermal radiation-transparent polyethylene films 39 and 37 and consequently is absorbed by blackened metal foils 36 and 30. Similarly, downward radiation flux is transmitted through the panes formed by polyethylene films 25 and 23 to be absorbed by blackened metal foils 22 and 14. Consequently, the indicated temperatures on thermometers 19 and 33 reach an equilibrium represented by the balancing of intercepted radiation flux with re-radiation from the blackened metal foils as their temperatures are increased, ignoring negligible transmission and other losses. It can be shown that the net radiation to and from the earth's surface is a function of the indicated temperatures on the thermometers in accordance with the following approximation:

$$R_{net} \approx a\sigma(T_t^4 - T_b^4) + K\Delta T$$

in which $R_{net}$ represents the net radiation, $T_t$ is the absolute temperature measured by thermometer 19, $T_b$ is the absolute temperature measured by thermometer 33, $\sigma$ is the Stefan-Boltzmann constant, K is the thermal conductivity of the insulation and $\Delta T$ is the difference in indicated temperatures, and $a$ is a constant.

Generally a device of this type shows a good comparison with net radiation measurements made with a ventilated radiometer (Suomi, Franssilla and Islitzer, An Improved Net Radiometer, Jour. Met., 11, 276–282 (1954)). At low sun angles the flat milky polyethylene film will cause the cosine response of the instrument to be poor. For example, at zenith angles of 25°, the ratio of net radiation measured with a ventilated radiometer to that measured with radiometer 10 is 1.0 whereas at zenith angles of 80° the same ratio rises to 1.37. However, at most latitudes, the error in total daily radiation will be small. During the night with diffuse radiation the cosine error is not as important.

FIGURES 3, 4 and 5 illustrate a modification of the instrument shown in FIGURES 1 and 2 designed for particularly light weight equipment and employing thermistors instead of thermometers to permit remote measurement of the indicated temperatures, for example, by inclusion of each of the thermistors in a Wheatstone bridge. Net radiometer 40 shown in FIGURES 3, 4 and 5 is constructed in the form of a 45° right triangular box having a thickness of 3″ and hypotenuse side length of 13″. Radiometer 40 is constructed as is shown more clearly in FIGURE 5 by stacking a series of sheets spaced apart by identical triangular frames 41. Each of frames 41 has the same triangular dimensions of the box to be formed and is constructed of three thin strips of balsa wood to provide a triangular box having an open top and open bottom. The height of each frame 41 is ⅜″. The assembly is put together cementing the edges of each of the sheets stretched across the frames to the edges of the frames and arranged in a sandwich including an outer upper sheet of polyethylene film 42 with a second polyethylene film 43 spaced just below this ⅜″ by a frame 41. Polyethylene films 42 and 43 typically are 0.75 mil thick. Film 43 is followed by a 0.75 mil film 44 of polyethylene terephthalate resin which is coated with black paint 45 on its upper surface and is silvered on its under surface 46. Three succeeding films 47 of polyethylene terephthalate (Mylar) resin are spaced by frames 41 immediately below film 44. Each of films 47 is coated on both surfaces with silver 48. Beneath this is spaced by a frame 41 a second film 49 of polyethylene terephthalate resin which is blackened on its under surface 50 and silvered on its upper surface 51. Spaced beneath film 49 are two additional sheets of polyethylene films 52 and 53, also having 0.75 mil thickness. A thermistor 54 is cemented to the upper blackened surface 45 of film 44 with its leads 55 and 56 extended in the space between films 44 and 43 and brought out through a sealed aperture 57 in the frame 41 spacing films 43 and 44 for connection to an external measuring circuit such as a Wheatstone bridge preferably attached to drive a recorder. Similarly, a thermistor 58 is cemented to the blackened undersurface 50 of film 49 with its leads 59 and 60 extended in the space between film 52 and film 49 and brought out through a sealed aperture 61 in the frame 41 spacing such films for connection to an external measuring and recording circuit. Desirably, the vertical edges 62, 63 and 64 of radiometer 40 are silvered, for example, by covering with aluminum foil.

Net radiometer 40, as will be evidenced from its construction, functions in the same manner as net radiometer 10 with films 47, the air entrapped between them and films 44 and 49, replacing insulation 13 and 29 of net radiometer 10. Some sacrifice in accuracy will result from the poorer separation of the edges of blackened surfaces 45 and 50 from the environment, however, by locating thermistors 54 and 58 centrally this error is reduced to a minimum. Because of its light weight and the measurement of temperature as an electrical signal, net radiometer 40 is particularly adapted to air-borne measurements.

Although the preceding description has been confined to net radiometers, it will be apparent that the device of the present invention is equally adaptable to other radiation measurements, for example in which radiation from a single source is concerned. Typical of such a situation would be the heat control of a home, a chicken brooder or the like where heat radiation rate from the floor and walls is about as important as the temperature of the air. A useful device constructed in accordance with the present invention for providing heating control is shown in FIGURE 6. In that figure the reference numeral 70 designates a "radiationstat" which includes a wooden hoop 71 of generally open ended cylindrical configuration which is glued at one end to a backing plate 72 having a peripheral edge 73a beyond the sides of hoop 71 and provided with suitable bores 73b for securing radiationstat 70 to the ceiling or wall of the room or the like by means of screws, bolts or other convenient fasteners. Cemented in the bottom of hoop 71 adjacent to bottom plate 72 is a cylindrical block of unicellular, air expanded polystyrene typically having a specific gravity of 0.025. Spaced centrally is a small wooden hoop 75 cemented on block 74 enclosing a bimetallic thermostatic switch 76. A third hoop 77 fitting tightly within hoop 71 is also cemented to the upper surface of block 74 spaced concentrically with hoop 75 and preferably also glued to the inner wall of hoop 71. Hoops 75 and 77 have the same height (about ¼ inch) such that their upper edges are in the same plane. Bimetallic thermostatic switch 76 is of generally conventional construction and includes a pair of movable contacts 78 and 79, contact 78 being mounted on the bimetallic element 80 and contact 79 being mounted on a rigid post 81 lying parallel to bimetallic element 80. Post 81 is affixed to insulation 74 and at its end opposite contact 79 carries an insulating spacer block 82 which on its opposite side carries bimetallic element 80. Bimetallic element 80 is thus spaced above post 81 and has its upper face blackened. Stretched across the upper edges of hoops 75 and 77 adjacent the upper blackened face of bimetallic element 80 is a thin polyethylene film 83 which is cemented to the upper edges of hoops 75 and 77. A second pair of concentric wooden hoops 84 and 85 having the same dimensions as hoops 75 and 77, respectively, are positioned in retaining hoop 71 and cemented along their under edges to polyethylene film 83 vertically aligned with hoops 75 and 77. A second thin polyethylene film 86 is stretched over the upper edges of hoops 84 and 85 to which it is cemented. A pair of leads 87 and 88 are connected, respectively, to bimetallic element 80 and post 81 and are brought through a sealed opening in hoops 75, 77 and 71 for connection to a heating plant control system. Preferably, the spacing of the contacts 78 and 79 of bimetallic switch 76 is arranged such that the contacts open above a predetermined temperature of element 80.

Radiationstat 70 is also provided with a shutter arrangement 90 for controlling the proportion of exposed surface of polyethylene film 86 and hence the proportion of radiation flux intercepted by radiationstat 70 which is effectively transmitted through film 86 and 83. Shutter 90 is mounted on four parallel posts 91 disposed at 90° intervals about retaining hoop 71. Each post 91 is affixed at one end to backing plate 72, lies along the outer side of hoop 71 and extends at its other end a short distance beyond hoop 71. Shutter 90 includes a box frame of generally open-ended rectangular construction formed of a pair of parallel end members 92 and a pair of parallel side members 93 which are affixed at their ends to the ends of posts 91 projecting beyond hoop 71. Nine louvers 94 are spaced parallel to each other between end members 92 adjacent to film 86 and are pivotally mounted at their ends in side members 93. Louvers 94 are suitably operated by a common mechanism to rotate together about their pivoted connections to side members 93 between a position at which louvers 94 are aligned, closing the center of the frame including members 92 and 93, and a position at which louvers 94 are at right angles to their common line, thereby leaving the center of the shutter frame virtually wide open.

In operation radiationstat 70 is secured, as indicated previously, to the ceiling of a room by nails or other fasteners placed through bores 73b in plate 72 with polyethylene film 86 pointed downward, that is, in a position inverted from that shown in FIGURE 6. Leads 87 and 88 are connected to the building heating control system such that the control system turns the heat supply off as the temperature of bimetallic element 80 exceeds the predetermined maximum. Since a person's comfort in any given room is based upon a combination of conduction, convection and radiation effects, the opening of shutter 90 is controlled to provide a proper balance between air temperature and motion (conduction and convection effects) and radiation change from the walls. The proper seting of shutter 90, once ascertained, will generally remain static in any given room, but will not necessarily be the same, even in adjoining rooms.

In the above radiometers and radiationstat, the frames or hoops are employed to minify heat loss and, in addition to balsa wood, various types of materials including other woods, metals such as steel, molded plastics, etc., can be employed for this purpose. Other equivalent transparent plastic type films can be employed in place of polyethylene although our investigations show polyethylene films of aboue 0.5–1.0 mil thickness to be preferred.

It will also be apparent to those skilled in the art that other shuttering devices can be employed in place of the louver type shutter illustrated above and that the invention covers all modifications falling within the scope thereof.

Although in the above description a blackened body which is absorbent to thermal radiation was employed for the purpose of providing maximum absorption of thermal radiation throughout the infrared spectrum, it will also be apparent to those skilled in the art that where measurement of radiation in selected wave lengths only is desired, coatings of materials absorptive to those selected wave lengths can be employed in place of black paint, carbon or other blackening media. Thus, for example, where it is desired to pick up specific wave lengths the receiver or absorptive coating can be changed and made more specific by use of materials such as talc, silicon monoxide, etc., to selectively absorb radiation having wave lengths in relatively narrow bands. As the radiometer is simple and economical and does not require calibration, it will also be apparent that the present invention provides a simple inexpensive method of direct measurement of net radiation.

This application is a continuation-in-part of our application Serial No. 697,703, filed November 20, 1957 (now abandoned).

It is claimed:

1. A radiation measuring device which includes a thermal detector including a thermally sensitive element responsive to changes in temperature thereof and a thermal radiation absorbent body positioned adjacent to said element in thermally conductive relationship therewith whereby the temperature of said element is a function of the thermal radiation to and from said body, thermal insulating means defining an enclosure in which said detector is positioned to insulate said detector from thermal transfer with the environment by conduction and convection, said thermal insulating means including a thin pane of crystalline polyethylene transparent to thermal radiation forming a radiation aperture whereby thermal radiation passes between the environment and said body through said pane, and the inside dimensions of said enclosure being limited to on the order of 0.7 centimeter in one direction with said radiation aperture and said thermal detector located at opposite ends of said limited dimension.

2. A radiation measuring device which includes an open-ended frame, a pair of thin panes of crystalline polyethylene supported across one end of said frame in closely spaced relationship on the order of about 0.7 centimeter, a second pair of thin panes of crystalline polyethylene supported across the other end of said frame in closely spaced relationship on the order of about 0.7 centimeter, a first sheet of material having a thermal radiation absorptive surface positioned transversely in said frame between said two pairs of polyethylene panes with the said surface thereof facing toward and spaced inwardly of the first named pair of polyethylene panes a distance on the order of about 0.7 centimeter, a second sheet of material having a thermal radiation absorptive surface positioned transversely in said frame between said two pairs of polyethylene panes with the said surface thereof facing toward and spaced inwardly of the said second named pair of polyethylene panes a distance on the order of about 0.7 centimeter, a plurality of sheets of material having silvered surfaces disposed transversely within said frame between said first and second sheets closely spaced from each other and from said sheets, a first thermal detector positioned in the space between the inner of said first named pair of polyethylene panes and said first sheet adjacent the said thermal radiation absorptive surface thereof, and a second thermal detector positioned in the space between the inner of said second pair of polyethylene panes and said second sheet adjacent the said thermal radiation absorptive surface thereof.

3. A radiation measuring device according to claim 2 in which the spacing of each member of the group including said first and second sheets and said plurality of silvered sheets is on the order of 0.7 centimeter from the next adjacent member of the group.

4. A radiation measuring device which includes thermal insulating means defining an open-ended frame, a thin pane of crystalline polyethylene supported across one end of said frame, a sheet of material having a thermal radiation absorptive surface positioned transversely in said frame with said surface thereof facing toward and spaced inwardly of said polyethylene pane a distance on the order of about 0.7 centimeter, and a thermal detector positioned in the space between said polyethylene pane and said sheet adjacent the said thermal radiation absorptive surface thereof and in thermally conductive relationship therewith whereby the temperature of said detector is a function of the thermal radiation to and from said sheet.

5. A radiation measuring device comprising thermal insulating means defining an enclosure having at least one open end, a pane of plastic film transparent to thermal radiant energy positioned across said open end, a thermal radiation absorptive surface in said enclosure spaced inwardly of said pane a distance on the order of about 0.7 cm. and parallel thereto, and a thermal detector, including a thermally sensitive element responsive to changes in temperature thereof, positioned in the space defined by said pane and said thermal radiation absorptive surface, said element being in thermally conductive relationship with said surface, whereby the temperature of said element is a function of the thermal radiation to and from said surface.

References Cited in the file of this patent

UNITED STATES PATENTS

| | | |
|---|---|---|
| 842,314 | Heeley | Jan. 29, 1907 |
| 1,988,858 | Quereau | Jan. 22, 1935 |
| 1,991,152 | Hickman | Feb. 12, 1935 |
| 2,083,317 | Dallenbach | June 8, 1937 |
| 2,547,173 | Rittner | Apr. 3, 1957 |
| 2,800,023 | Obermaier | July 23, 1957 |
| 2,856,539 | Orthuber et al. | Oct. 14, 1958 |
| 2,983,887 | Wormser | May 9, 1961 |

FOREIGN PATENTS

| | | |
|---|---|---|
| 739,339 | Great Britain | Oct. 26, 1955 |